(12) United States Patent
Waddell

(10) Patent No.: US 9,089,983 B1
(45) Date of Patent: Jul. 28, 2015

(54) THEMED DESSERT FOR BANANA

(76) Inventor: Melissa Waddell, Orange, CA (US)

( * ) Notice: Subject to any disclaimer, the term of this patent is extended or adjusted under 35 U.S.C. 154(b) by 0 days.

(21) Appl. No.: 13/417,242

(22) Filed: Mar. 10, 2012

Related U.S. Application Data

(60) Provisional application No. 61/464,839, filed on Mar. 10, 2011.

(51) Int. Cl.
*B26D 3/10* (2006.01)
*A21D 13/00* (2006.01)
*A47J 25/00* (2006.01)

(52) U.S. Cl.
CPC .............. *B26D 3/10* (2013.01); *A21D 13/0029* (2013.01); *A47J 25/00* (2013.01); *B26D 2210/02* (2013.01)

(58) Field of Classification Search
CPC .. B26D 3/10; B26D 2210/00; B26D 2210/02; B26D 2210/06; B26D 2210/08; B26D 2007/327; B26D 11/00; B26D 7/08; B26D 3/24; B26D 3/26; B26D 3/04; A47J 25/00; A47J 23/00; B26B 3/04; B26B 27/00; B26B 9/00; B26B 9/02; A21C 15/04; A21D 13/0025; A21D 13/0029; A23N 3/00; A23N 7/00; A23N 7/002; A23N 7/02; A23N 4/14; A23N 4/16; A23N 4/18; A23N 4/20; A23N 4/22; A23N 4/24; A22C 11/003; A22C 11/10; A22C 17/004; A22C 17/0046; A22C 17/04; A22B 5/16; A22B 5/163; A22B 5/166; A22B 5/168; A22B 5/201
USPC ............. 426/87, 89, 102, 104, 549, 282–284, 426/383, 138, 139, 143, 479, 480, 481, 484, 426/514
See application file for complete search history.

(56) References Cited

U.S. PATENT DOCUMENTS

| | | | |
|---|---|---|---|
| D101,549 S | 10/1936 | Morton | |
| 2,394,322 A * | 2/1946 | McKee | 426/87 |
| 2,810,338 A | 10/1957 | Dawson | |
| 3,139,043 A * | 6/1964 | Reilly | 53/581 |
| D205,126 S | 6/1966 | Haessler | |
| 3,605,842 A * | 9/1971 | Kuri | 30/276 |
| 4,136,447 A * | 1/1979 | Gillham, Sr. | 30/287 |
| 4,507,866 A * | 4/1985 | Rimmeir | 30/316 |
| 4,763,414 A * | 8/1988 | McNeill, II | 30/113.1 |
| D314,853 S | 2/1991 | Garrett | |

(Continued)

OTHER PUBLICATIONS

Frozen Bananas (Jul. 24, 2010), http://bakedbree.com/frozen-bananas.*

(Continued)

*Primary Examiner* — Viren Thakur
(74) *Attorney, Agent, or Firm* — George P. White

(57) ABSTRACT

The present device is a themed dessert having a theme for use with a peeled banana to encourage the consumption of bananas. The themed dessert includes a holding sheet with at least one edible strip removably disposed on the holding sheet. The edible strip is configured to be placed on and wrapped around a portion of a peeled banana to give the peeled banana the appearance of a themed character. The themed character may be partially formed by the shape of each edible strip and partially formed by edible ink printed on each edible strip. A themed shaped cake supports the peeled banana and the cake may include such shapes as a banana, taco shell, or hotdog bun. The themed dessert may include at least one themed dessert topping, such as hotdog condiments or taco toppings.

3 Claims, 7 Drawing Sheets

(56) References Cited

U.S. PATENT DOCUMENTS

| | | |
|---|---|---|
| D377,257 S | 1/1997 | Calvin |
| 6,156,357 A * | 12/2000 | Franklin .................... 426/95 |
| 6,612,440 B1 | 9/2003 | Agulnik |
| 6,616,958 B1 * | 9/2003 | Stewart .................... 426/383 |
| 6,838,101 B2 | 1/2005 | Hoy |
| 6,878,390 B2 | 4/2005 | Murray et al. |
| 6,968,624 B1 * | 11/2005 | Peters ........................ 30/281 |
| D579,626 S | 11/2008 | Schulman |
| D625,896 S | 10/2010 | Flaksman |
| 2001/0046535 A1 * | 11/2001 | Bowling .................... 426/87 |
| 2005/0003056 A1 | 1/2005 | Romanach et al. |
| 2005/0170040 A1 * | 8/2005 | Moulton ...................... 426/1 |
| 2005/0186313 A1 * | 8/2005 | Manley ...................... 426/383 |
| 2006/0088629 A1 | 4/2006 | Otto |
| 2010/0055258 A1 * | 3/2010 | Bernard ...................... 426/138 |
| 2010/0278979 A1 | 11/2010 | Koplish |

OTHER PUBLICATIONS

Old Fashioned Banana Roll Recipe (Feb. 6, 2009), http://web.archive.org/web/20090206024235/http://www.bellaonline.com/articles/art1998.asp.*

"Banana Sponge Cake." May 10, 2009 http://www.seriouseats.com/2009/05/photo-of-the-day-banana-sponge-cake.html.*

* cited by examiner

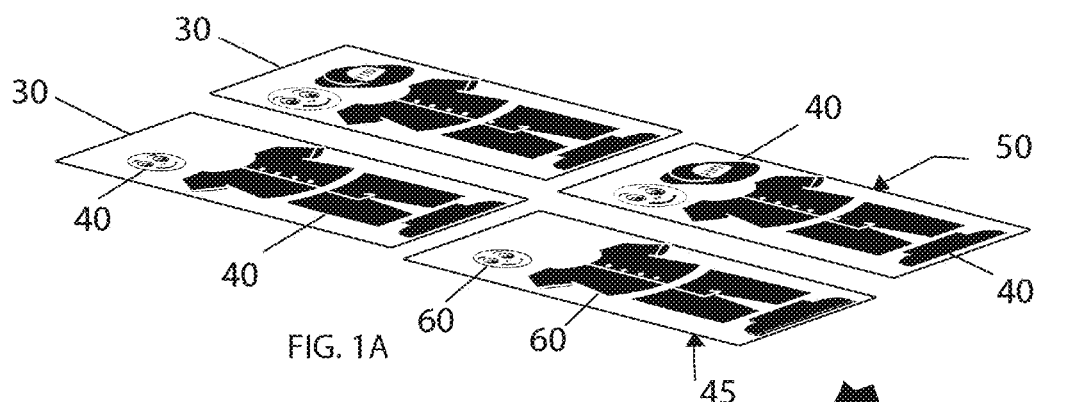
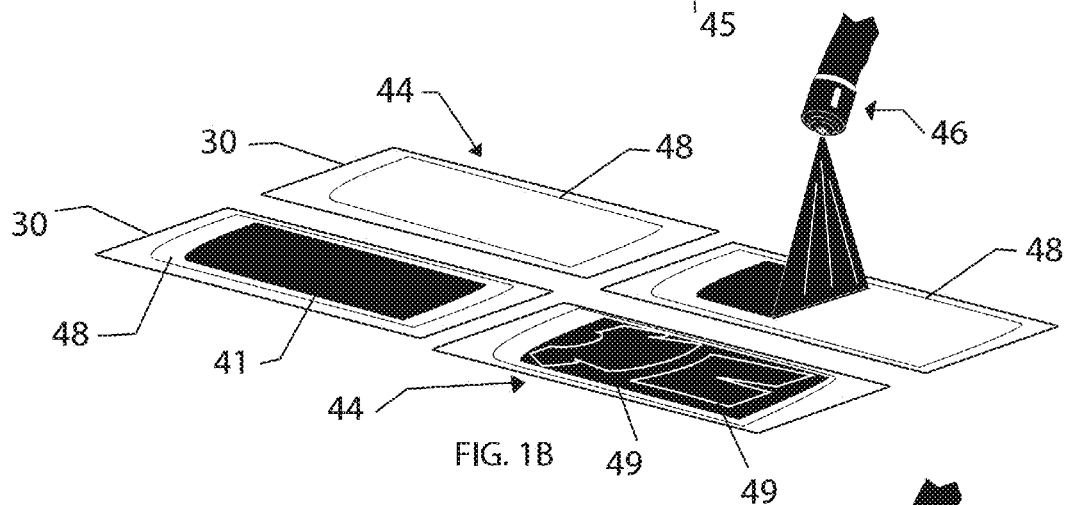
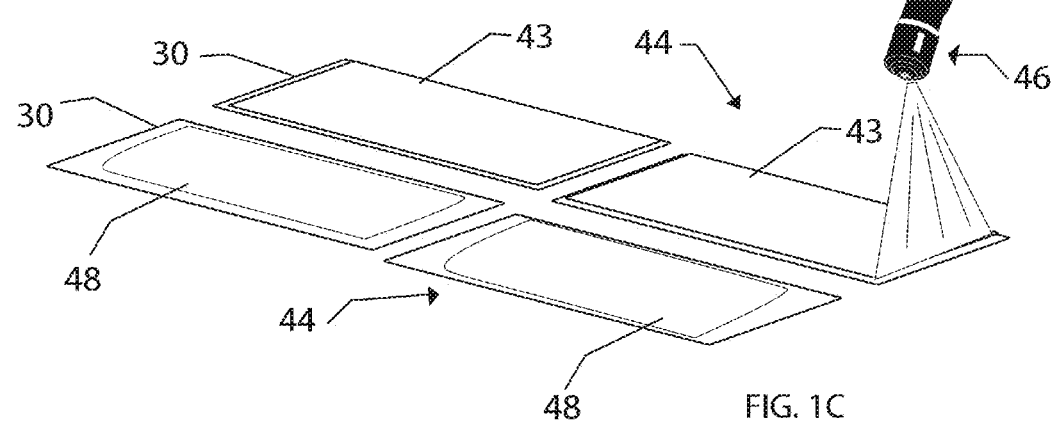

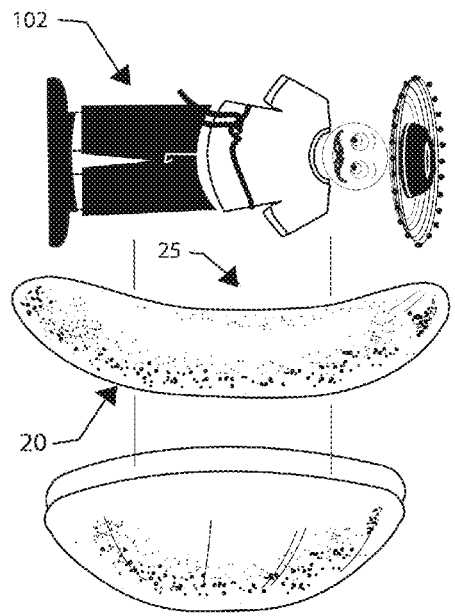
FIG. 5A
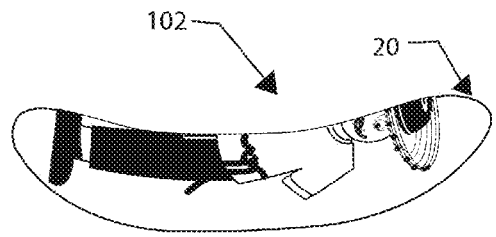
FIG. 5B
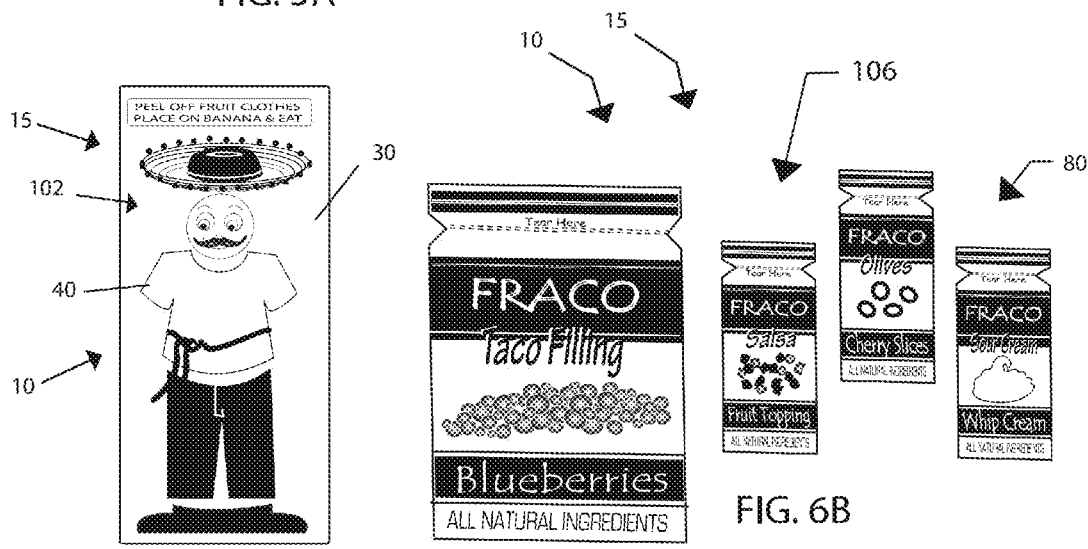
FIG. 6A
FIG. 6B

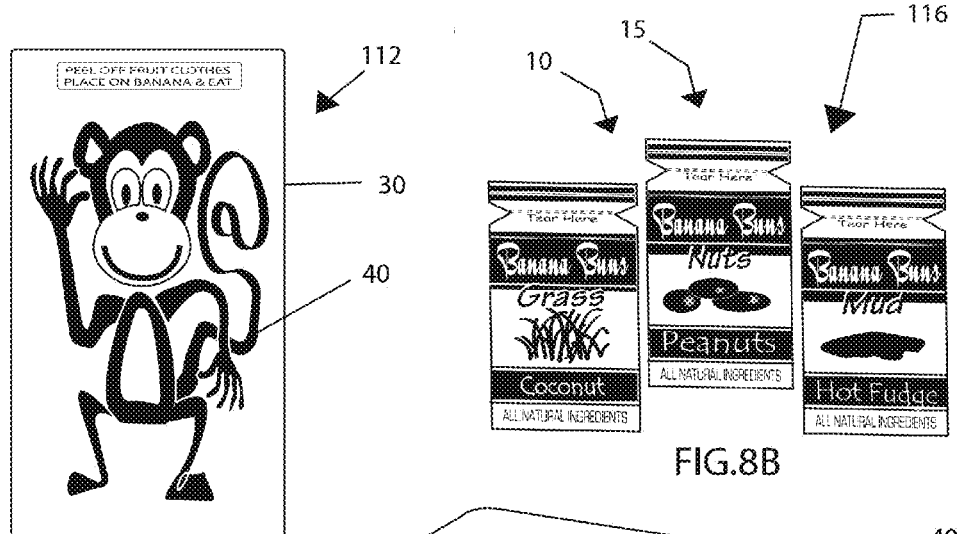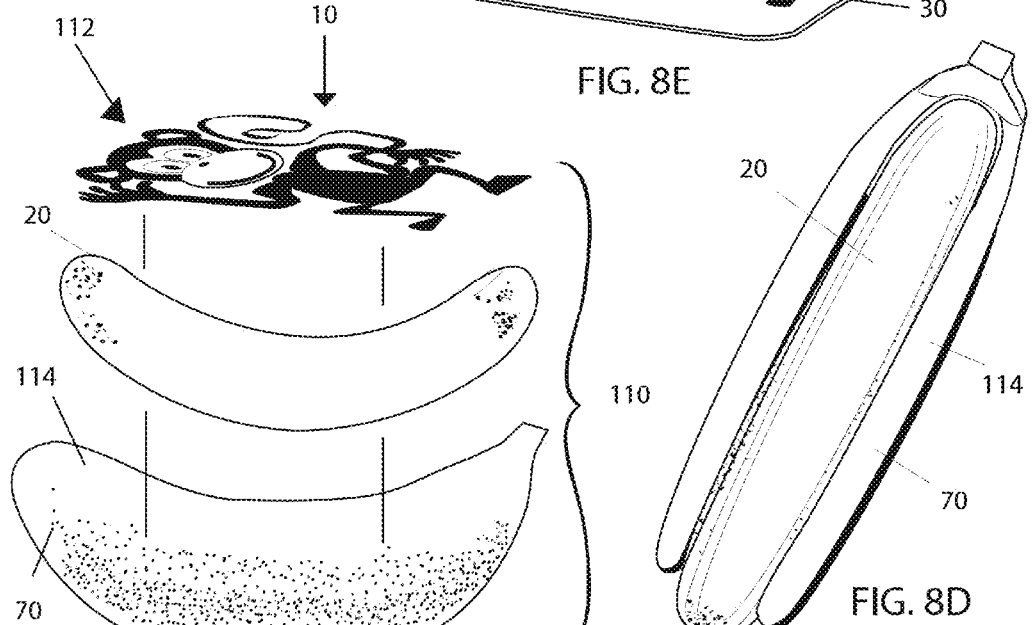

US 9,089,983 B1

THEMED DESSERT FOR BANANA

CROSS-REFERENCE TO RELATED APPLICATIONS

This application claims the benefit of U.S. Provisional Patent Application 61/464,839, filed on Mar. 10, 2011, and incorporated herein by reference.

STATEMENT REGARDING FEDERALLY SPONSORED RESEARCH AND DEVELOPMENT

Not Applicable.

FIELD OF THE INVENTION

This invention relates to desserts, and more particularly to a themed dessert for a banana.

BACKGROUND OF THE INVENTION

A delicious and nutritious food enjoyed by millions across the world is the banana. Because of their impressive potassium content, bananas are highly recommended by doctors for patients whose potassium is low. Also, bananas are a food rich in fiber and vitamins. Putting all of the nutritional figures together shows the banana is among the healthiest of fruits. Therefore, an item is needed that encourages the consumption of bananas.

One aspect of encouraging children and adults that are resistant to eating fruits such as bananas is to make the eating experience more fun. By making the eating experience more interactive, children and adults will be distracted from the idea they are eating something healthy and instead focus on the fun of the activity. Therefore, an item is needed that provides a structure to make eating a banana an interactive experience. Such an interactive experience should include the ability to mimic the experience of eating other foods that children are more inclined to consume.

Eating bananas can be messy, especially for young children. Traditionally, people partially peel a banana and use the attached banana peel to hold the banana, thereby avoiding directly touching the banana. However, when peeling down to the bottom of the banana, occasionally the banana falls out of the peel requiring the eater to use their fingers to grab the peeled banana and the eater is left holding the slippery peel. This approach can be especially tricky for children. Therefore, an item is needed that provides a structure to conveniently hold and consume a peeled banana. Furthermore the needed item should be sized and shaped appropriately to accommodate the unusual shape of a banana.

Therefore, there is a need for an item that encourages the consumption of bananas. Such a needed item should provide the structure to make eating a banana an interactive experience that mimics the experience of eating other foods that children are more inclined to consume. Also, an item is needed that provides the structure to conveniently hold and consume a peeled banana. Furthermore, the needed item should be sized and shaped appropriately to accommodate the unusual shape of a banana. The present invention accomplishes these objectives.

SUMMARY OF THE INVENTION

The present device is a themed dessert having a theme for use with a peeled banana. The themed dessert includes a holding sheet with at least one edible strip removably disposed on the holding sheet. The at least one edible strip is configured to be placed on and wrapped around a portion of a peeled banana to give the peeled banana the appearance of a themed character.

The themed character may be at least partially formed by the shape of each edible strip. In another embodiment, the themed character is at least partially formed by edible ink printed on each edible strip. Each edible strip may be at least partially comprised of natural fruit product. In another embodiment, each edible strip is at least partially comprised of flexible rice paper. In another embodiment, the themed character is at least partially comprised of fruit concentrate sprayed on flexible rice paper. Preferably, each edible strip is comprised of a mixture which is easily dissolvable when consumed.

The themed dessert may further include a themed shaped cake, with the peeled banana supported by the themed shaped cake. The themed shaped cake is preferably comprised of sponge cake material. Preferably, the themed shaped cake is made to accommodate a peeled banana by cutting a core the approximate shape and size of a peeled banana. The banana shaped core may be left in the cake to support during transportation and packaging and then may be removed and optionally consumed or discarded after purchase. The themed dessert may further include at least one themed dessert topping to be applied on the peeled banana and the themed character. In one embodiment, the themed character is not used and the dessert topping is applied directly on the peeled banana.

In one version of the themed dessert, the theme is a baseball theme, with the themed character being a baseball player, the themed shaped cake being in the shape of a hotdog bun, and each themed dessert topping being in the style of hotdog condiments. In another version of the themed dessert, the theme is a taco theme, with the themed character being a traditional Mexican character, the themed shaped cake being in the shape of a taco shell, and each themed dessert topping being in the style of taco toppings.

In another version of the themed dessert, the theme is a monkey theme. In this embodiment, the themed character is a monkey character, the themed shaped cake is in the shape of a banana, and each themed dessert topping is in the style of items in a theme. In this embodiment, the themed character is a baby character, the themed shaped cake is thin and in the shape of a baby quilt.

The themed dessert is an item that encourages the consumption of bananas. The dessert provides a structure to make eating a banana an interactive experience that mimics the experience of eating other foods that children are more inclined to consume. The themed dessert provides the structure to conveniently hold and consume a peeled banana. Furthermore, the dessert is sized and shaped appropriately to accommodate the unusual shape of a banana. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1A is a perspective view of the invention, illustrating a method of preparing a themed character;

FIG. 1B is a perspective view of the invention, illustrating a method of preparing a themed character;

FIG. 1C is a perspective view of the invention, illustrating a method of preparing a themed character;

FIG. 5A is an exploded view of a themed character and a peeled banana;

FIG. 5B is a side elevational view of a themed character placed on a peeled banana;

FIG. 6A is a top plan view of a traditional Mexican character;

FIG. 6B is a top plan view of themed dessert toppings in the style of taco toppings;

FIG. 8A is a top plan view of a monkey character;

FIG. 8B is a top plan view of themed dessert toppings in the style of items in a monkey's natural environment;

FIG. 8C is an exploded perspective view of a monkey themed dessert;

FIG. 8D is a top perspective view of a peeled banana in a banana shaped cake;

FIG. 8E is a perspective view of a monkey character on a holding sheet;

DETAILED DESCRIPTION OF THE PREFERRED EMBODIMENT

Figure 2A:
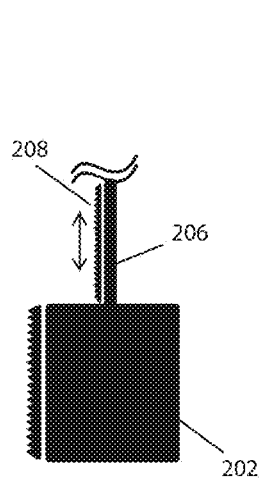
FIG. 2A is a side elevational view of a coring tool.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

With respect to the drawings, FIG. 1 illustrates a themed dessert 10 having a theme 15 for use with a peeled banana 20. The peeled banana can be frozen or fresh or even cooked. In FIG. 1, the themed dessert 10 includes a holding sheet 30. The holding sheet 30 may be made from a thin flexible plastic sheet, as seen in FIG. 8E, or other suitable materials such as card stock paper with a water resistant finish. In FIG. 1A, at least one edible strip 40 is removably disposed on the holding sheet 30. In FIGS. 9B-9C and FIGS. 5A-5B, the at least one edible strip 40 is configured to be placed on and wrapped around a portion 25 of a peeled banana 20 to give the peeled banana 20 the appearance of a themed character 50. In one embodiment, the themed character 50 is at least partially formed by the shape 55 (FIG. 1A) of each edible strip 40. In another embodiment, the themed character 50 is at least partially formed by edible ink 60 (FIG. 1A) printed on each edible strip 40.

In one embodiment, each edible strip 40 is at least partially comprised of fruit strip material. The fruit strip is preferably made from a fruit puree and formed with a consistency dense enough to be durable when being removed from the holding sheet 30 and placed on the peeled banana 20, yet flexible enough to easily form around the shape of the peeled banana 20. The fruit strip is preferably thin enough for a child to easily bite off pieces using normal biting pressure. In another embodiment, each edible strip 40 is at least partially comprised of flexible rice paper. In one embodiment, the themed character 50 is at least partially comprised of a fruit concentrate sprayed on flexible rice paper. The rice paper embodiments are preferably formed with a consistency resilient enough to remain durable when being removed from the holding sheet 30 and placed on the peeled banana 20, yet flexible enough to easily form around the shape of the peeled banana 20. The rice paper embodiments are preferably thin enough for a child to easily bite off pieces using normal biting pressure.

Figure 9A:
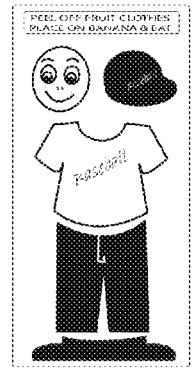
FIG. 9A is a top plan view of baseball player character.
Figure 9H:
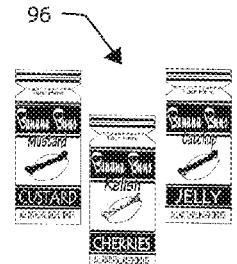
FIG. 9H is a top plan view of themed dessert toppings in the style of hotdog condiments in alternate packaging.
Figure 9G:
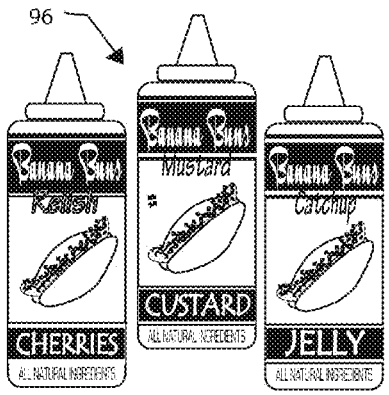
FIG. 9G is a top plan view of themed dessert toppings in the style of hotdog condiments.
Figure 9B:
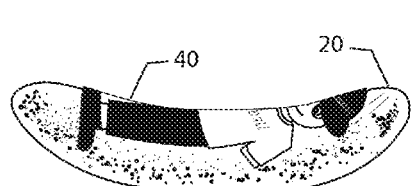
FIG. 9B is a side elevational view of a themed character placed around a peeled banana.
Figure 9D:
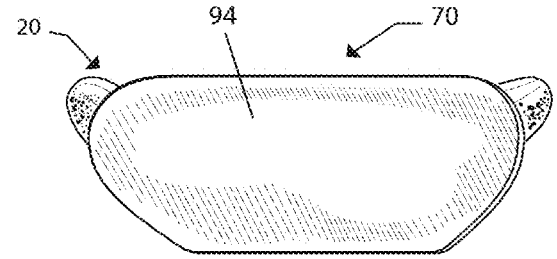
FIG. 9D is a side elevational view of a peeled banana in a hotdog bun shaped cake.
Figure 9E:
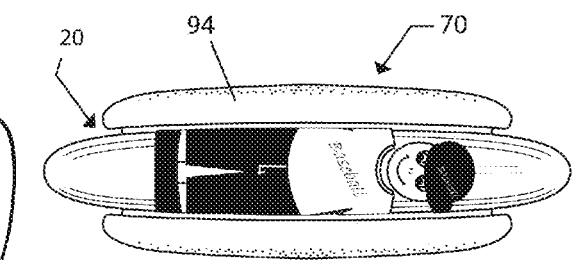
FIG. 9E is a top plan view of a themed character placed around a peeled banana in a hotdog bun shaped cake.
Figure 9C:
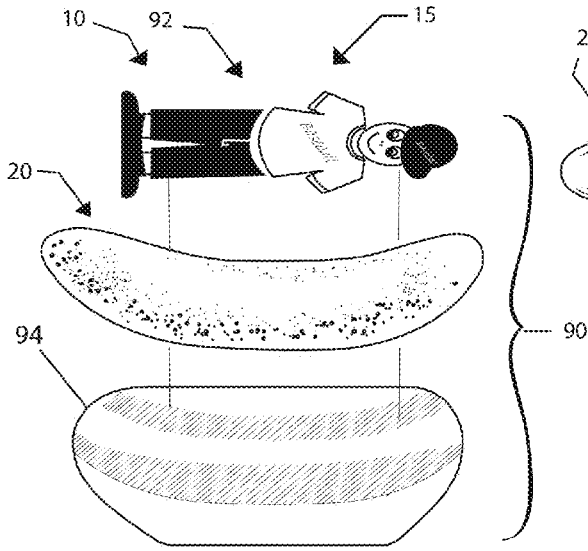
FIG. 9C is an exploded view of a baseball themed dessert.
Figure 9F:
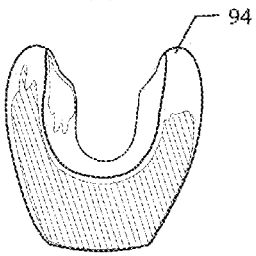
FIG. 9F is a side perspective view of a themed shaped cake in the shape of a hotdog bun.

In one embodiment in FIGS. 9D-9E, the themed dessert 10 further includes a themed shaped cake 70, with the peeled banana 20 supported by the themed shaped cake 70. In one embodiment, the themed shaped cake 70 is comprised of cake with sponge cake consistency similar to angel food cake. The themed shaped cake 70 may be made of angel food cake in one embodiment. Other embodiments of the themed shaped cake 70 include a variety of flavors such as chocolate, carrot, zucchini, and white cake to name a few. Also, a variety of colors may be used for the themed shaped cake 70.

Figure 2B:
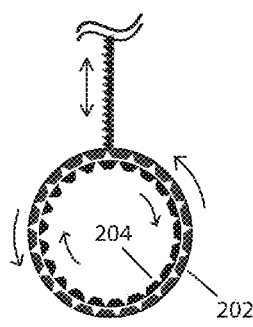
FIG. 2B is a front elevational view of a coring tool.
Figure 3B:
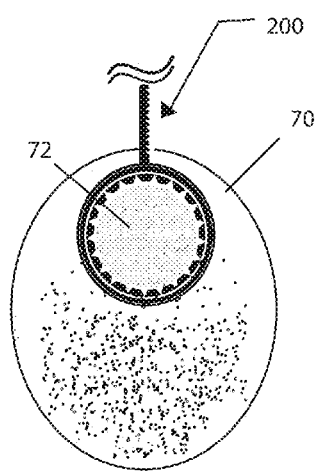
FIG. 3B is a rear elevational view of a coring tool and a themed shaped cake.
Figure 3A:
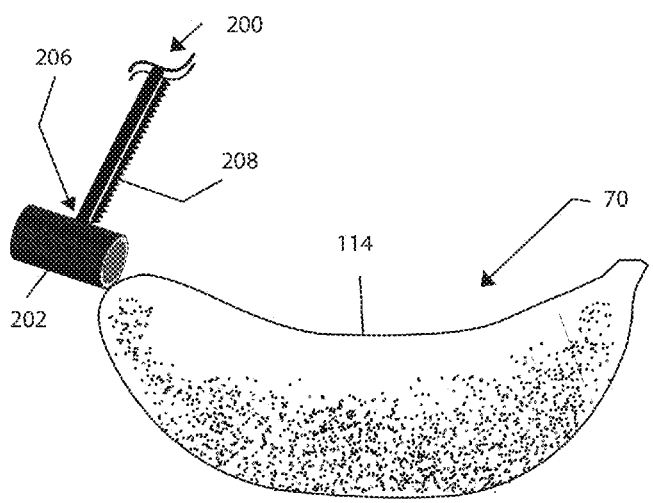
FIG. 3A is a side perspective view of a coring tool and a themed shaped cake.
Figure 3C:
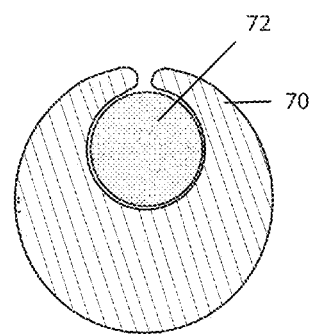
FIG. 3C is a rear elevational view of a themed shaped cake and a banana shaped core.

In another embodiment, the themed shaped cake 70 is made to accommodate a peeled banana 20 by cutting a banana shaped core 72, as illustrated in FIGS. 3A-3B. In one embodiment, a coring tool 200 (FIGS. 2A-2B) is used to core the themed shaped cake 70 and create the banana shaped core 72. In FIGS. 2A and 3A, the coring tool 200 includes a vertical blade 208 configured with a guiding shaft 206, with the vertical blade 208 able to oscillate up and down in a sawing action. In FIG. 2B, the coring tool 200 includes a rotational blade 204 configured with an outer housing 202, with the rotational blade 204 able to oscillate rotationally to create a sawing action. In use, the guiding shaft 206 guides the coring tool 200 along the length of the themed shaped cake 70, with the rotational blade 204 coring out the banana shaped core 72 and the vertical blade 208 cutting open the themed shaped cake 70 above the banana shaped core 72. In one embodiment in FIG. 3C, the banana shaped core 72 is left in the cake 70 to provide support during transportation and packaging and then may be removed to be optionally consumed or discarded after purchase.

In one embodiment, the themed dessert 10 further includes at least one themed dessert topping 80 (FIG. 6B) to be applied on the peeled banana 20 or themed character 50.

In one version of the themed dessert 10 in FIGS. 9A-9F, the theme 15 is a baseball theme 90. In this embodiment, the themed character 50 is a baseball player 92 (FIG. 9A), the themed shaped cake 70 is in the shape resembling a hotdog bun 94 (FIG. 9D), and each themed dessert topping 80 is in the style of hotdog condiments 96 (FIGS. 9G-9H). The "Mustard" topping made from creamy yellow custard, and a "Relish" topping made from finely chopped Rainier, golden, cherries. Additional dessert toppings 80 may be included as appropriate for hotdog condiments 96.

In another version of the themed dessert 10 in FIGS. 4A-4D and 6A-6B, the theme 15 is a taco theme 100. In this embodiment, the themed character 50 is a traditional Mexican character 102 (FIG. 6A), the themed shaped cake 70 is in the shape resembling a taco shell 104 (FIG. 4A), and each themed dessert topping 80 is in the style of taco toppings 106 (FIG. 6B). The taco toppings 106 may include a "Taco Filing" topping (106a) made from blueberries, a "Shredded Cheese" topping (106b) made from shredded rice paper, a "Salsa" topping (106c) made from various chopped fruit, an "Olives" topping (106d) made from slices of pitted dark Bing cherries, and a "Sour Cream" topping (106e) made from whipped cream. Additional dessert toppings 80 may be included as appropriate for a taco them 100.

Figure 4A:
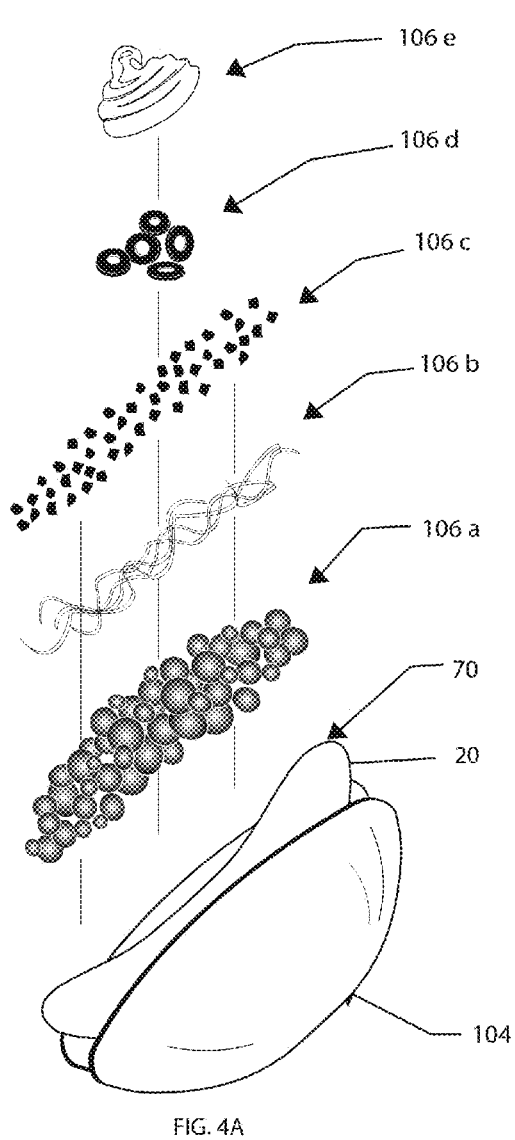
FIG. 4A is a partially exploded perspective view of the invention, illustrating a taco themed dessert.
Figure 4B:
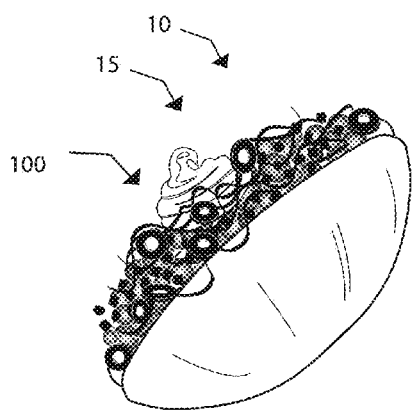
FIG. 4B is a perspective view of the invention, illustrating a taco themed dessert.
Figures 4C, 4D:
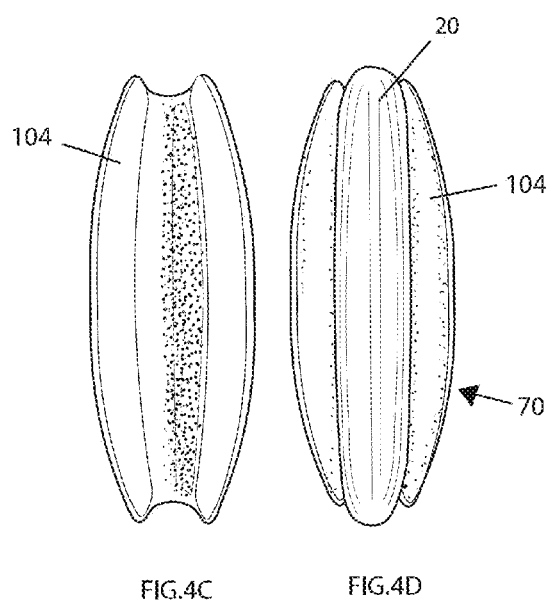
FIG. 4C is a top plan view of a themed shaped cake in the shape of a taco shell.
FIG. 4D is a top plan view of a themed shaped cake in the shape of a taco shell with a peeled banana.

In an alternate embodiment, the themed character 50 is not used and each dessert topping 80 is applied directly on the peeled banana 20, as illustrated in FIG. 4A. In such an embodiment, the themed dessert 10 having a theme 15 for use with the peeled banana 20 includes the themed shaped cake 70 with the removable banana shaped core 72 to accommodate the peeled banana 20.

In one more version of the themed dessert 10 in FIGS. 8A-8D, the theme 15 is a monkey theme 110. In this embodiment, the themed character 50 is a monkey character 112 (FIG. 8A), the themed shaped cake 70 is in the shape resembling a banana 114 (FIG. 8C), and each themed dessert topping 80 is in the style of items in a monkey's natural environment 116 (FIG. 8B). The fruit toppings 116 may include "Grass" made from coconut shavings, "Nuts" made from peanuts, and "Mud" made from hot fudge. Additional dessert toppings 80 may be included as appropriate for a monkey theme 110.

Figures 7A, 7B:
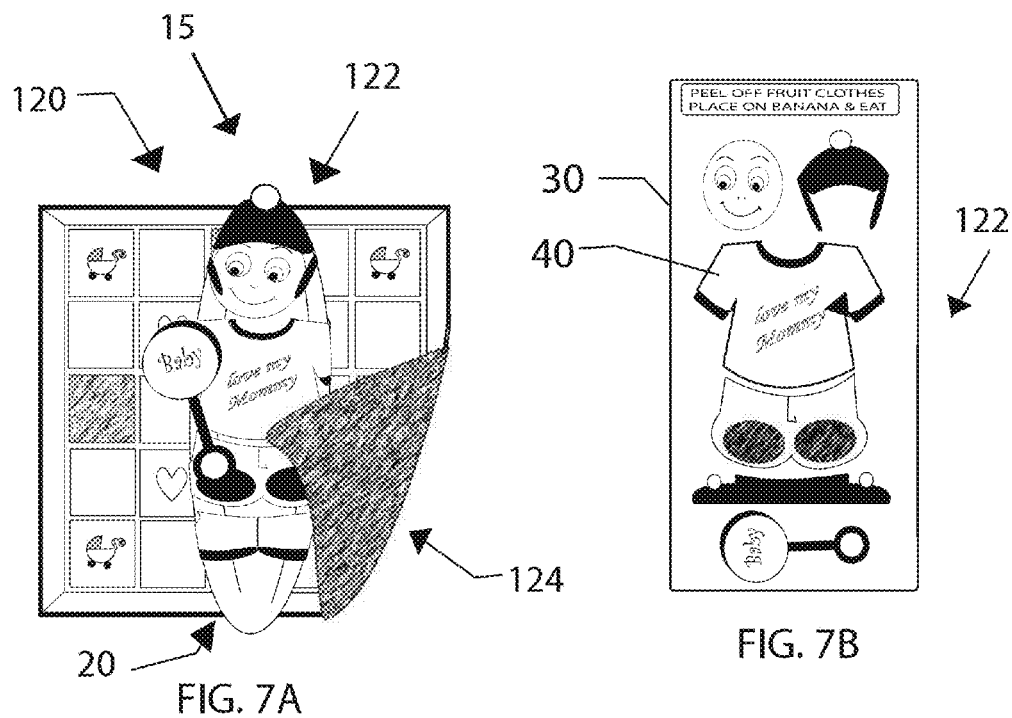
FIG. 7A is a top plan view of a baby themed dessert.
FIG. 7B is a top plan view of a baby character.
Figures 7C, 7D:
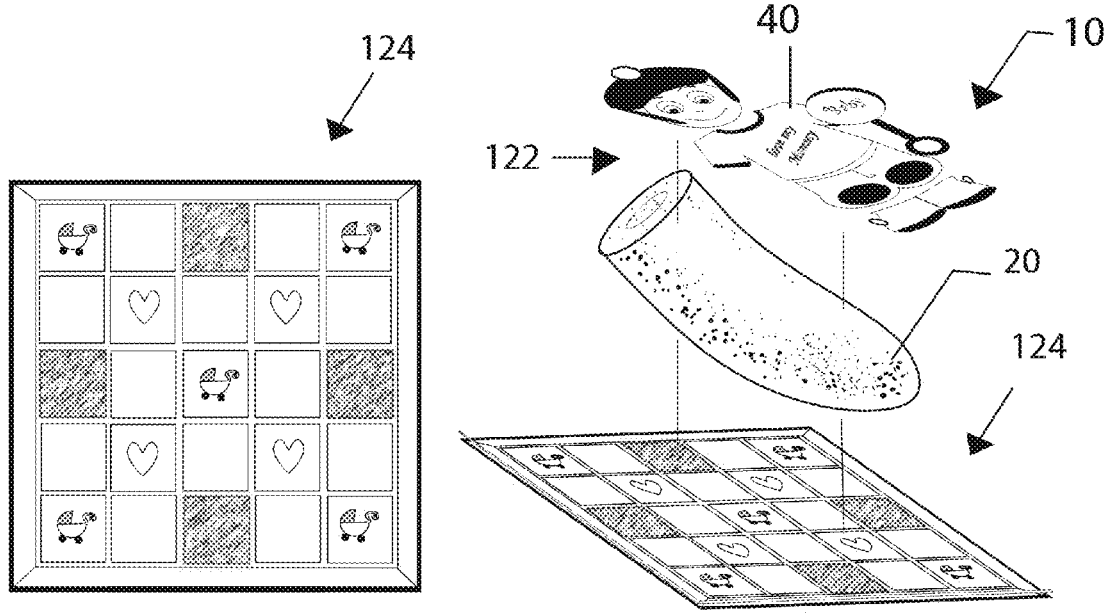
FIG. 7C is a top plan view of themed shaped cake in the shape of a quilt.
FIG. 7D is an exploded view of a baby themed dessert.

In another version of the themed dessert 10 in FIGS. 7A-7D, the theme 15 is a baby theme 120. In this embodiment, the themed character 50 is a baby character 122 (FIG. 7B), and the themed shaped cake 70 is in the shape resembling a baby quilt 124 (FIG. 7C). Preferably, the baby quilt 124 is only ⅛" inch thick, making it easy to wrap around the peeled banana 20.

In use, a method of preparing a themed dessert 10 using a peeled banana 20 includes the following steps. A themed shape cake 70 configured to accommodate a peeled banana 20 is provided. The peeled banana 20 is provided. The peeled banana 20 is placed into the themed shaped cake 70. A themed character 50 formed from at least one edible strip 40 removably located on a holding sheet 30 is provided. The themed character 50 is removed from the holding sheet 30. The themed character 50 is placed around a portion 25 of the banana 20. At least one themed dessert topping 80 is provided. At least one themed dessert topping 80 is applied onto the banana 20 and themed character 50. In one embodiment, a frozen unpeeled banana 22 is provided and the frozen banana 22 is mechanically peeled.

In a further embodiment illustrated in FIGS. 1A-1C, a themed character 50 is formed on each edible strip 40 by first providing a holding sheet 30. A thin coat of edible adhesive 43 is applied onto the holding sheet via a sprayer 46 (FIG. 1C). Then, edible rice paper 48 is provided, as shown in FIG. 1B, and applied to the edible adhesive 43 on the holding sheet 30. The edible adhesive 43 removably holds the rice paper 48 on the holding sheet 30. In FIG. 1B, several fine layers of fruit concentrate 44 are sprayed onto the rice paper 48 forming a fruit strip 41 via the sprayer 46. Details of the themed character 50 are printed onto each fruit strip 41 using edible ink 60. In FIG. 1B, the themed character 50 is then kiss-cut to remove the excess fruit strip 41 without cutting the underlying holding sheet 30, thus creating the shape 55 of the themed character 50, with the themed character 50 removably located on the holding sheet 30.

While a particular form of the invention has been illustrated and described, it will be apparent that various modifications can be made without departing from the spirit and scope of the invention. For example, additional themed characters 50 may include fire fighters, cowboys, cowgirls, doctors, nurses, as well as characters wearing ball gowns and tuxedos, which would be appropriate for a wedding theme. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

It is claimed:

1. A method of coring an elongated, curved, banana-shaped cake to prepare it to accept and retain a banana, comprising a starting material of a curved, elongated cake, having a concave side and a convex side, the method comprising:

a) providing a cake cutting tool having an elongated linear portion knife blade, the linear portion terminating at a depending annular shaped cutter, the annular shaped cutter having an annular serrated edge blade having a diameter about the diameter of a banana, and at least a portion of the serrated edge blade is free to rotate, creating a sawing motion;

b) providing an elongated, curved, banana-shaped cake having a concave side and a convex side that together outline the curved banana shape, and opposing ends;

c) placing the cake cutting tool past one end of the banana-shaped cake with the annular serrated edge blade facing the cake, and with the elongated linear portion extending upward from the annular shaped cutter and facing the concave side of the banana-shaped cake; and d) drawing the cake cutting tool through the cake from end to opposing end with the annular serrated edge blade of the cake cutting tool rotating in the sawing motion while following the concave curve of the cake; thereby coring a banana shaped core from the elongated, curved, banana-shaped cake with the annular serrated edge blade, while cutting a straight slit above the banana shaped core along the concave side of the banana-shaped cake with the linear portion knife blade.

2. The method of coring the cake of claim 1 where the linear portion is a serrated knife blade.

3. The method of claim 1 where the coring is offset from the center line of the cake extending through the elongated cake towards the concave side of the cake.

\* \* \* \* \*